United States Patent [19]
Arimoto et al.

[11] Patent Number: 5,431,449
[45] Date of Patent: Jul. 11, 1995

[54] FILM STORING SHEET

[75] Inventors: Keigo Arimoto; Toru Tanibata, both of Wakayama, Japan

[73] Assignee: Noritsu Koki Co., Ltd., Wakayama, Japan

[21] Appl. No.: 198,296

[22] Filed: Feb. 18, 1994

[30] Foreign Application Priority Data

Apr. 2, 1993 [JP] Japan .................. 5-076880

[51] Int. Cl.⁶ .............................................. B42D 1/00
[52] U.S. Cl. ................................. 281/31; 281/38; 402/79; 206/455; 206/473; 206/578; D19/33
[58] Field of Search ............. 40/159; 402/79, 4; 281/31, 38, 40, 36, 41, 46; 206/455, 456, 578, 232, 472, 473; D19/33

[56] References Cited

U.S. PATENT DOCUMENTS

| | | | |
|---|---|---|---|
| 3,797,146 | 3/1974 | Holes | 402/8 X |
| 4,247,999 | 2/1981 | Latino | 283/36 X |
| 4,310,117 | 1/1982 | Gullet | 462/64 X |
| 4,530,176 | 7/1985 | Rejwan | 40/359 |
| 4,720,733 | 1/1988 | Ohtake et al. | |
| 4,966,285 | 10/1990 | Otake et al. | 283/36 X |
| 5,000,319 | 3/1991 | Mermelstein | 402/79 |
| 5,031,773 | 7/1991 | Manico et al. | 206/455 |
| 5,040,216 | 8/1991 | Policht | 402/79 X |
| 5,195,683 | 3/1993 | Gaetano | 206/455 X |
| 5,251,746 | 10/1993 | Gresh et al. | 206/232 |
| 5,263,579 | 11/1993 | Blackman | 206/455 X |

FOREIGN PATENT DOCUMENTS

| | | |
|---|---|---|
| 0550885 | 7/1993 | European Pat. Off. . |
| 0550939 | 7/1993 | European Pat. Off. . |
| 0578049 | 1/1994 | European Pat. Off. . |
| 60-48467 | 4/1985 | Japan .......... 281/38 |
| WO91/20017 | 12/1991 | WIPO . |

OTHER PUBLICATIONS

"EZ2C Archival Photo Pages", The Professional Choice: EZ2C!, p. 40.

*Primary Examiner*—Frances Han
*Attorney, Agent, or Firm*—Armstrong, Westerman, Hattori, McLeland & Naughton

[57] ABSTRACT

A film storing sheet comprising: an index print on which recorded images on a developed film is printed and a film sheet provided at the rear side of the index print and having a plurality of small pockets wherein the developed film is stored. Users can easily distinguish specific prints by seeing the index print.

4 Claims, 3 Drawing Sheets

FILM STORING SHEET

BACKGROUND OF THE INVENTION

The present invention relates to a film storing sheet. More particularly, it relates to a film storing sheet wherein users can know contents of images at first sight and easily distinguish specific image when users wish to make extra prints.

Conventionally, a developed film is divided into some pieces and stored in a semi-transparent film sheet (hereinafter referred to film sheet). Users can know contents of the film stored in the film sheet by checking prints, to which the film is printed, one by one, or by holding the film directly to the light.

However, light intensity and hue of the developed film is reverse of those of the printed photographic paper so that users cannot easily know images of negatives, especially for colour photograph. When users wish to make extra prints, therefore, it takes much time for them to know the specific image and is difficult to distinguish the specific image among the other images if images similar to the specific image exist in the film. Consequently, wrong film numbers might be selected for extra prints.

Also, when developed film and prints are stored separately, there might arise a problem that specific prints are found but the corresponding film is lost.

In view of the above circumstances, it is an object of the present invention to provide a film storing sheet wherein users can easily distinguish specific film and specific number of frames users wish to make extra prints.

SUMMARY OF THE INVENTION

In accordance with the present invention, there is provided a film storing sheet comprising: an index print on which recorded images on a developed film is displayed, and a film sheet provided at the rear side of the index print and having a plurality of small pockets wherein the developed film is stored.

Preferably, at least one print sheet with pockets for storing prints is provided on the film storing sheet.

According to a film storing sheet of the present invention, since a developed film is stored at the rear side of an index print which shows contents of the developed film for storing, users can easily distinguish specific film and specific number of frames users wish to make extra prints.

Further, when a development film is stored with the corresponding prints, there is avoided a problem that only the developed film is lost.

DETAILED DESCRIPTION

Explained herebelow is a film storing sheet of the present invention, based on the attached drawings.

Figure 1:
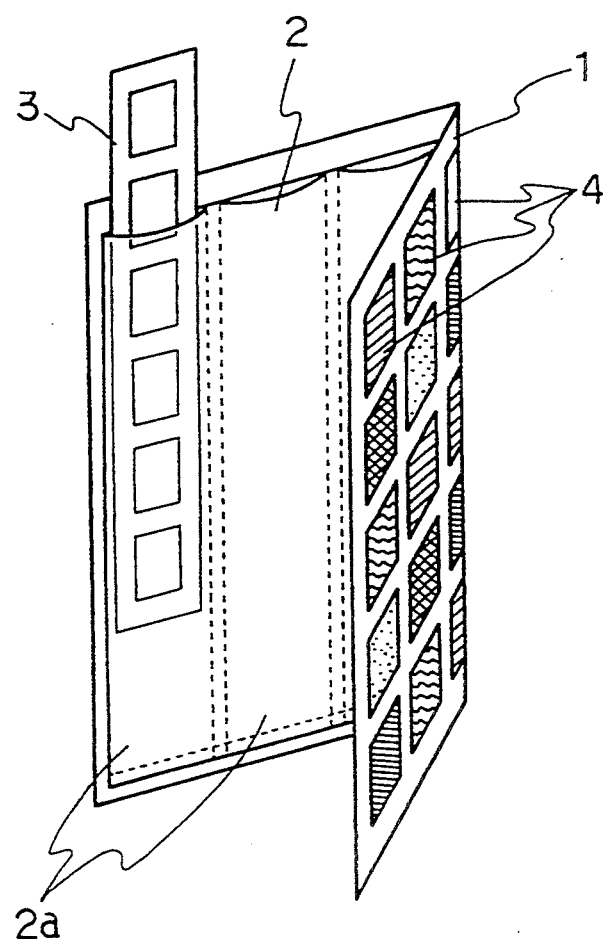
FIG. 1 is an explanatory view of one embodiment of a film storing sheet of the present invention.

In FIG. 1, numeral 1 denotes an index print, numeral 2 denotes a film sheet, and numeral 3 denotes a developed film.

The index print 1 is folded in two and the film sheet 2 is attached to the rear side thereof by adhesives and the like. At the surface of the index print 1, images of frames 4 of the developed film 3 contained in the film sheet 2 are printed in numeral order of frame numbers. The contents of the developed film 3 and frame numbers of specific prints can be distinguished at first sight. If frame numbers are shown in the images of frames 4, users can easily understand which image of frames corresponds to a specific part of the developed film 3. The index print 1 might be printed by ordinary film printing method, or might be printed by thermal sublimation method and the like. The index print 1 is not necessarily folded in two. A film sheet can be provided at the rear side of one sheet of the index print 1 (not folded).

Figure 3:
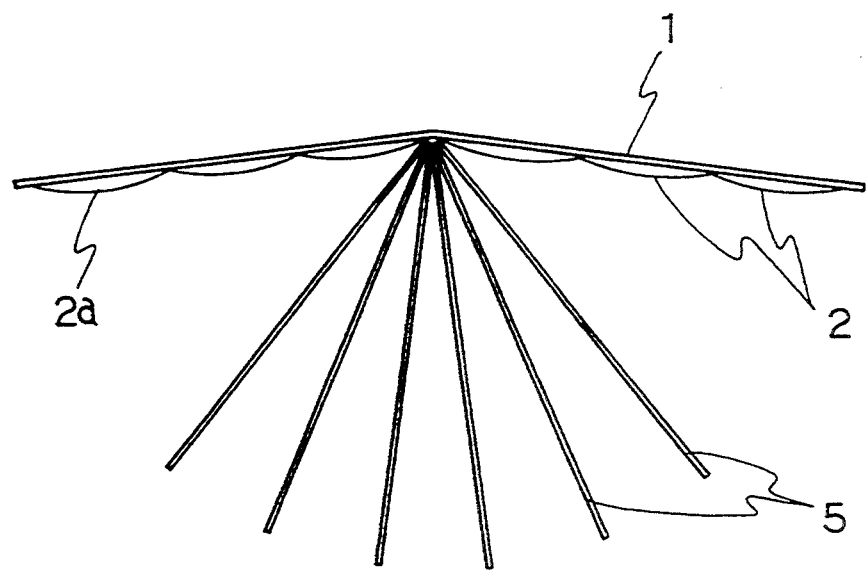
FIG. 3 is a view of the film storing sheet shown in FIG. 2, viewed from above.

The film sheet 2 has small pockets 2a for storing a plurality piece of divided developed film 3 in such a manner that one piece is stored in one small pocket 2a. The developed film 3 is ordinarily cut every 6 frames. For example, a film of 36 frames needs six small pockets 2a. As shown in FIG. 3, three pockets are disposed at right side and left side respectively, so that a boundary line positions at the center of the film sheet.

Figure 2:
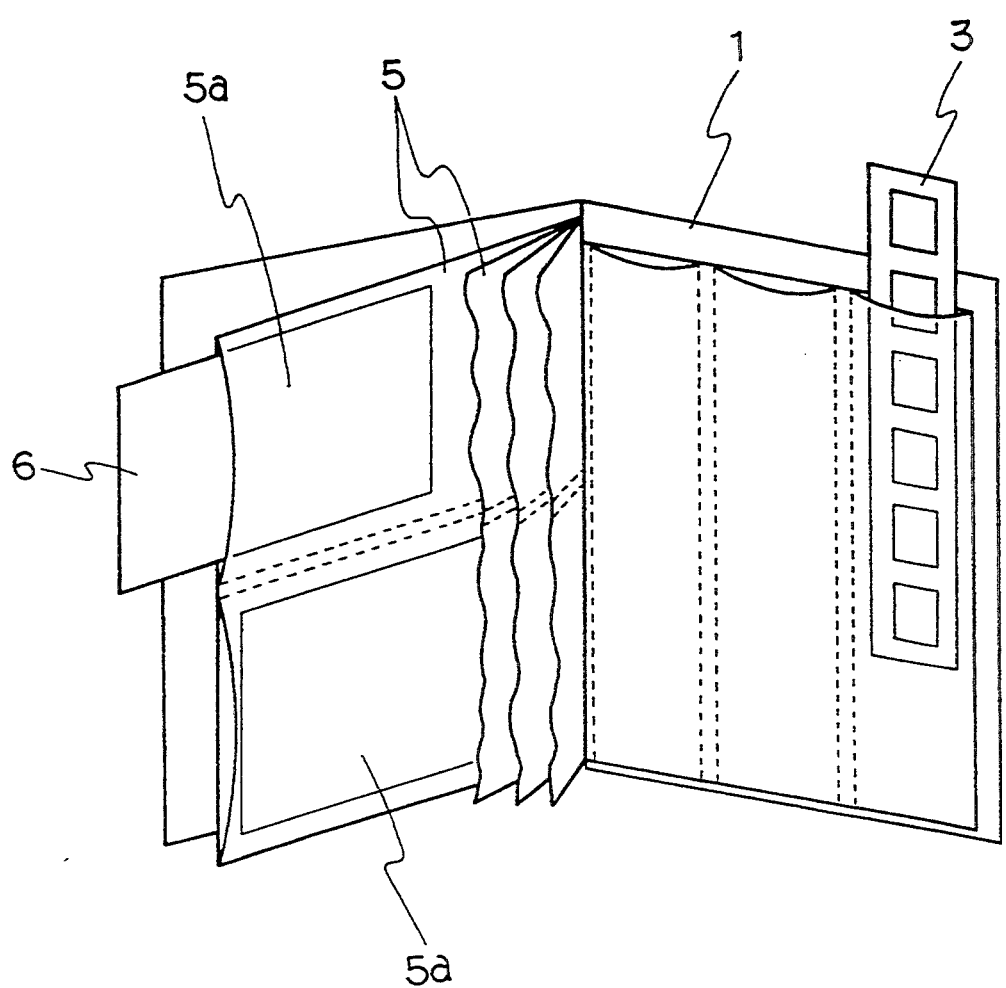
FIG. 2 is an explanatory view of another embodiment of the present invention wherein a plurality of sheet with pockets for storing prints are further provided.

As shown in FIG. 2, it is also preferable that the index print 1 is folded in two, and sheets 5 for prints, generally used in small-sized album, are bound at the fold to make a booklet-type film storing sheet. The pocket-type sheet 5 for prints includes a plurality of pockets 5a consisting of transparent sheets for storing print 6. When the developed film 3 is stored with the prints, the developed film is not lost and users can immediately find out the corresponding film when they wish to make extra prints.

As described above, according to the film storing sheet of the present invention, users can easily distinguish specific prints by seeing the index print. Further, when a developed film is stored with the corresponding prints, there can be avoided a problem that only the developed film is lost.

While only certain presently preferred embodiments have been described in detail, as will be apparent with those familiar with the art, certain changes and modifications can be made without departing from the spirit and scope of the invention as defined by the following claims.

What is claimed is:

1. A film storing sheet comprising:
    an index print on which recorded images on a developed film are printed,
    a film sheet provided at a rear side of the index print and having a plurality of small pockets where the developed film is stored; and
    at least one print sheet with pockets for storing a plurality of prints.

2. The film storing sheet of claim 1, wherein said index print is folded in two and said film sheet is attached to a rear side of said index print by adhesives.

3. The film storing sheet of claim 2, wherein at a surface of said index print, images of frames of said developed film of said film sheet are printed in numerical order by frame number.

4. The film storing sheet of claim 3, wherein said developed film is provided in lengths of 6 frames each.

* * * * *